Jan. 6, 1970
G. B. FOSTER
3,488,583
NON-CONTACTING TRANSDUCER SYSTEM EMPLOYING TWO SEQUENTIALLY
SWITCHED ELECTRODES TO SIMULATE VIBRATION
Filed Oct. 3, 1967
5 Sheets-Sheet 1
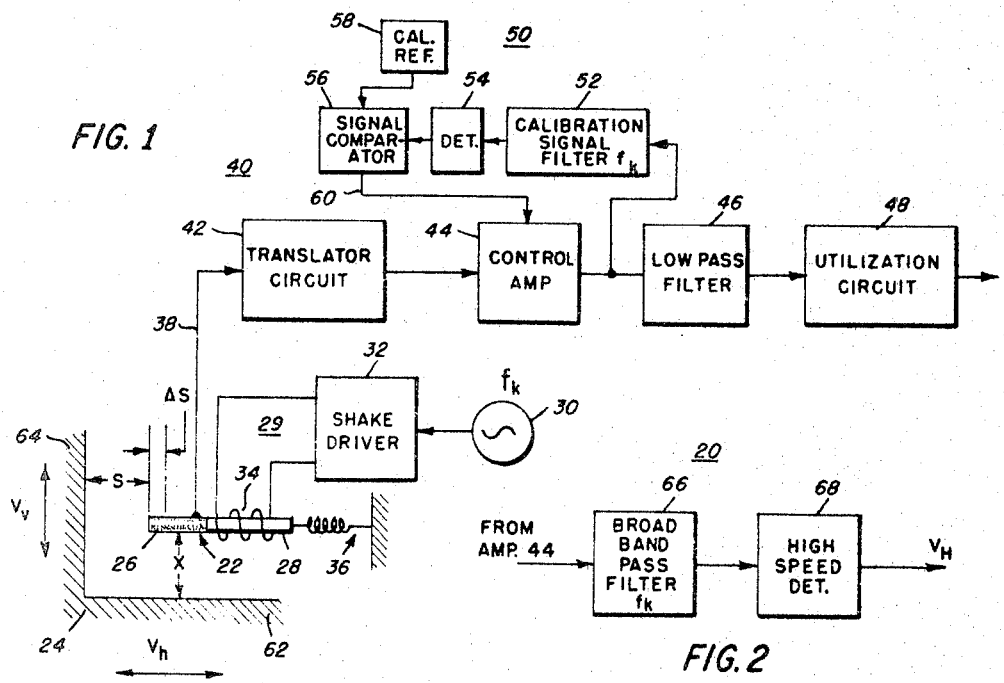
FIG. 1
FIG. 2
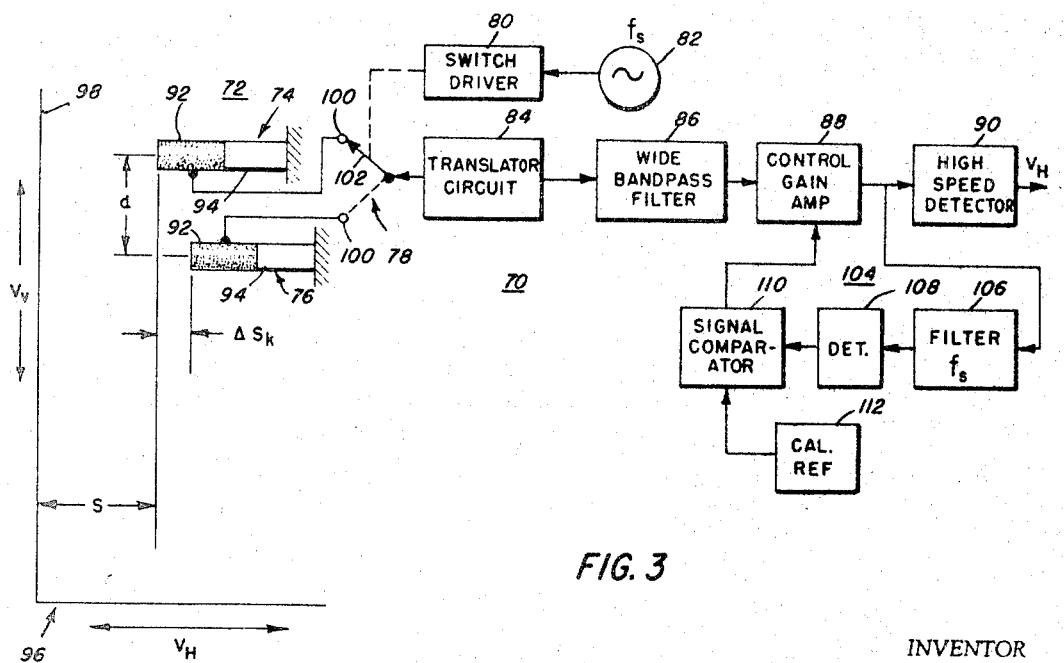
FIG. 3
INVENTOR
GEORGE B. FOSTER
BY
Le Blanc & Shur
ATTORNEY

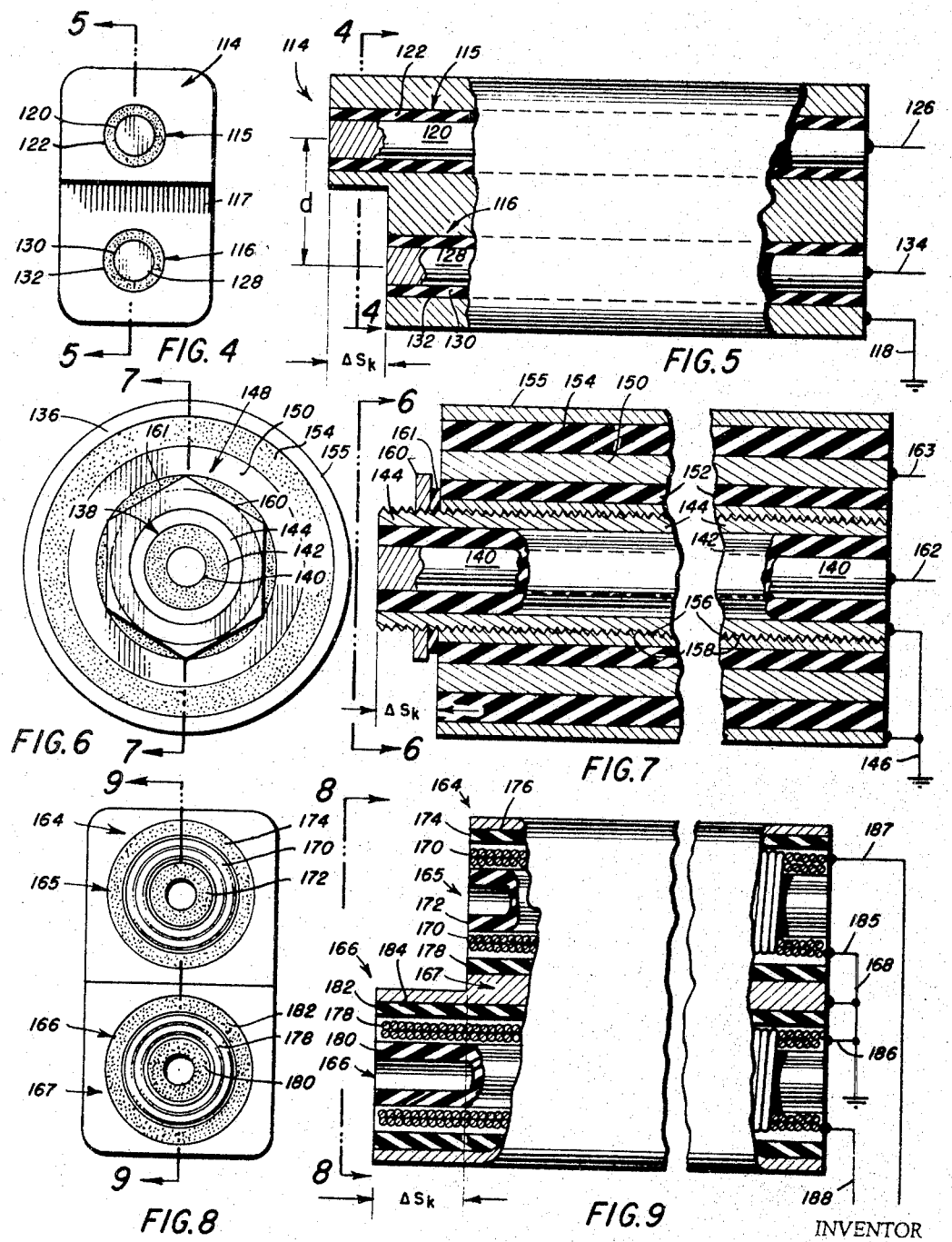

INVENTOR
GEORGE B. FOSTER

BY
Le Blanc & Shur
ATTORNEY

Jan. 6, 1970

G. B. FOSTER 3,488,583

NON-CONTACTING TRANSDUCER SYSTEM EMPLOYING TWO SEQUENTIALLY
SWITCHED ELECTRODES TO SIMULATE VIBRATION

Filed Oct. 3, 1967

INVENTOR
GEORGE B. FOSTER

BY
Le Blanc & Shur
ATTORNEY

INVENTOR
GEORGE B. FOSTER

United States Patent Office 3,488,583
Patented Jan. 6, 1970

3,488,583
NON-CONTACTING TRANSDUCER SYSTEM EMPLOYING TWO SEQUENTIALLY SWITCHED ELECTRODES TO SIMULATE VIBRATION
George B. Foster, Worthington, Ohio, assignor to Reliance Electric & Engineering Co., Columbus, Ohio, a corporation of Ohio
Filed Oct. 3, 1967, Ser. No. 672,488
Int. Cl. G01r 27/26
U.S. Cl. 324—61                                29 Claims

ABSTRACT OF THE DISCLOSURE

A system is described for non-contact measurement of vibration or dimension comparison comprising an energy sensitive transducer system, signal processing means, and automatic gain control means to adjust the system response to an apparent incremental variation in the spacing between the pickup means and the object under inspection. The apparent incremental variation is produced by a pair of pickup elements spaced at different distances from the object under inspection which pickups are rapidly sequentially switched into the circuit. Directional measurement is achieved by proper selection of system parameters and by appropriate demodulation of the pickup output component associated with the apparent pickup displacement. Linear operation is achieved by providing for automatic control of the apparent incremental variation in proportion to the difference in the system sensitivity at a reference location in comparison with the actual pickup sensitivity.

---

The present invention relates to non-contact measurement of displacement in a machine or other object under inspection and more particularly to displacement measuring apparatus capable of providing directional response with linear or non-linear sensitivity and characterized by heretofore unachievable frequency response and dynamic range.

Numerous transducer systems have been developed for dimension and vibration measurement, both for operational monitoring and for production line inspection. Early developments in these areas employed contact transducers generally responsive to the position of the object under inspection, or its time derivatives. Such devices relied on the actual motion of a pickup element to produce a measurable electrical signal. Systems of this type, however, were subject to several disadvantages, including limited low frequency response, dynamic range, etc. Moreover, for vibration measurement, the attachment of the sensing element to the object under investigation frequently resulted in such disturbance of the mechanical system that meaningful measurement was not obtainable and for dimension measurements the surface of the object was subject to deflection or damage by physical contact.

Non-contacting measurement systems have been proposed as a solution to the foregoing difficulties, but substantial problems have been encountered in the areas of calibration and standardization since such systems were found to be highly dependent upon environmental variations and upon an inherent non-linear sensitivity of the various pickup elements themselves.

Many of the difficulties with non-contacting pickup systems have been overcome by the employment of continuous calibration techniques such as disclosed in present assignee's U.S. Patent No. 3,180,136, to George B. Foster, entitled "Continuously Calibrated Displacement Measuring Transducer System." Briefly, according to the continuous calibration techniques of the Foster patent, a pickup, sensitive to energy variation in space, is positioned near, but not in contact with the object under inspection, and is subjected to a controlled cyclic variation in position relative to the object under inspection. System calibration is achieved by control of the overall transducer system gain, i.e., sensitivity, by comparison of the actual system response to the calibrating displacement with a reference or desired response.

The above described continuous calibration technique has been found to produce excellent results under a wide variety of operational conditions whereby the concept of a non-contacting transducer system has been transformed from a mere laboratory phenomenon to a practical and useful test device.

For certain applications, however, it has been found that the transducer systems disclosed in the aforementioned Foster patent are of somewhat limited utility. For example, it has been found that under certain conditions, objects other than those actually under inspection tend to modify the energy effects to which the pickups are responsive. Under such conditions, the pickups employed in the Foster patent exhibit a substantial degree of omnidirectionality. Thus, vibration or displacement other than that actually under observation results in a component in the pickup output signal. This is undesirable not only due to masking of the desired signal by the unwanted signal, but also because the continuous calibration of the system sensitivity is only controlled with respect to the measurement of displacements parallel to the calibrating displacement.

Thus, in order to achieve directional sensitivity, e.g., for measurement of vibration in a complex mechanical structure, or for dimensional comparison or position measurement in two or more directions, modification of the basic concepts taught in the Foster patent has been necessary.

In assignee's co-pending United States patent application Ser. No. 672,602, entitled Surface Interruption Calibrated Non-Contact Transducer System, filed concurrently herewith in the name of George B. Foster, there is disclosed a modification of the basic system of the Foster Patent No. 3,180,136, wherein continuous calibration is achieved by the employment of an interrupted calibration surface on the object under inspection. The system is characterized by a non-vibrating pickup calibrated by the apparent vibration of the object under inspection due to the passage of the interrupted surface through the pickup field of sensitivity. By appropriate design of the interrupted surface, it is possible to provide multiple axis vibration and position measurement characterized by directional sensitivity and providing a relatively wide frequency response and dynamic range.

The foregoing system, while achieving the benefits of continuous calibration as set forth in the Foster patent, and dispensing with the need for mechanical vibration of the pickup itself, is nonetheless subject to a number of limitations. First, in order to achieve a practical mechanism for causing the interrupted surface to pass in front of the pickup in a controlled manner, it is desirable that a portion of the machine or other object under inspection be rotatable, which, in practice, requires the accessibility of a rotating shaft or the like on which the calibrating surface may be installed.

Further, due to various practical considerations, the permissible dimensions of both the pickup and the interrupted calibrating surface employed are subject to some limitation. Thus, when used to provide directional sensitivity, the frequency response and dynamic range of the interrupted surface calibration system is somewhat limited, though considerably in excess of that heretofore attainable.

While the foregoing transducer system has been found to be a highly valuable and versatile complement to the systems described in the aforementioned Foster patent, the limitations mentioned prevent the utilization of such systems in a number of important applications. The non-contact transducer system of the present invention is intended as a further complement to those systems described above and is characterized by greatly extended frequency response and dynamic range, by avoidance of the need for a vibratory pickup, and by independence of the nature of the object under inspection, whereby directional measurement of large and small displacement over a wide frequency range in non-rotating objects is easily achieved. Moreover, the system may be utilized to provide a highly linear, as well as directional, response when applied to dimensional comparison or distance measurement and may be adapted, if desired, to provide similar linear response when applied to vibration measurement.

Briefly, in accordance with the present invention, there is provided a transducer system comprising a pair of pickup elements responsive to distance dependent energy variations in space, electronic signal processing circuitry, and means for alternately coupling the output of each pickup element to the signal processing circuitry. Continuous calibration is attained by disposing the pickup elements in close proximity to but not in contact with the object under inspection, with a fixed difference in separation distance from the object to each of the pickups. Rapid switching between the two pickups then produces an apparent vibration between the pickup and the object under inspection. For use as a non-contact transducer for measurements of vibrations of an object under study, the overall system sensitivity is adjusted to maintain a desired incremental response to the apparent vibration independent of environmental variations, such as temperature changes, contamination, long term variations of pickup sensitivity, etc., and independent of the actual standoff distance at which the pickup arrangement is positioned.

In accordance with a further embodiment of the invention, a pair of pickup elements are disposed in a fixed differential distance relation to the overall pickup to object spacing, the output corresponding to each pickup is alternately switched into an output circuit producing an AC signal whose amplitude is a non-linear response to changes in the separation distance between the pickup and the object under inspection.

In another embodiment of the invention, a pair of pickup elements are adapted for variable positioning relative to each other and are coupled to means for automatically adjusting the pickup differential distance to the object in a manner to produce a linear relationship between the pickup differential distance and the overall pickup to object spacing.

In still another embodiment, by maintaining an appropriate relationship between the rate of switching between pickups and the expected frequencies of vibration to be measured, and by appropriate signal processing, it is possible to achieve a pickup characterized by directional sensitivity over a broad range of vibration frequencies.

In yet a further embodiment, the pair of pickup elements disposed at a differential distance with relation to the overall spacing between the pickup and the object under inspection are switched alternately to proximity responsive circuit means to produce a signal calibrating the incremental response of the circuit means to time variation of the spacing between the pickup and the object along the axis of the differential distance.

Accordingly, it is a general object of this invention to provide an improved non-contracting continuously calibrated transducer system.

It is a related object of this invention to provide a non-contacting transducer system adapted to highly directional measurement of position and vibration.

It is a further object of this invention to provide a calibration system operable within the teachings of U.S. Patent 3,180,136, but without requiring a physical motion of the proximity responsive means.

It is a further object of this invention to provide a non-contacting transducer system providing a signal output having an adjustable functional relationship to the distance between the transducer pickup and the object under inspection.

It is a further object of this invention to provide a non-contacting continuously calibrated directional transducer system characterized by heretofore unavailable frequency response and dynamic range.

It is a related object of this invention to provide a non-contacting transducer system as described above including a longitudinally spaced pair of energy snesitive pickup elements adapted to be sequentially coupled at high speed to an electronic processing circuit.

It is an additional object of this invention to provide a non-contacting transducer system as described above with fixed longitudinal spacing between the pickup elements which may be utilized either for vibration measurement or distance gauging.

It is a further object of this invention to provide a non-contacting transducer system including a pair of spaced pickup members as described above and characterized by means for continuously adjusting the incremental sensitivity of the transducer system to a conrolled apparent calibrating vibration to maintain the desired level of sensitivity independent of the distance between the pickup elements and the object under inspection.

It is also an object of this invention to provide a non-contacting transducer system for dimensional comparison or position measurement including a pair of longitudinally spaced elements as described above and characterized by means for adjusting the spacing between the pickup elements to maintain a linear relationship between the misalignment and the position or dimension o be measured.

The exact nature of this invention, as well as other objects and advantages thereof, will be apparent from consideration of the following detailed description in conjunction with the accompanying drawings, in which:

FIGURE 1 is a schematic diagram of a continuously calibrated non-contacting transducer system in accordance with the Foster United States Patent No. 3,180,136 showing an application in which the same is of somewhat limited utility;

FIGURE 2 is a block diagram showing the manner in which the system of FIGURE 1 might theoretically be adapted to overcome the above-mentioned limitation;

FIGURE 3 is a generalized schematic diagram of the sequentially switched transducer system in accordance with the present invention showing the manner in which the limitations of the system of FIGURE 1 may be overcome in practice;

FIGURE 4 is an end elevation showing a first embodiment of a pickup assembly in accordance with the present invention;

FIGURE 5 is a partially sectional view taken along line 5—5 of FIGURE 4;

FIGURE 6 is an end elevation of a second embodiment of a pickup assembly in accordance with the present invention;

FIGURE 7 is a partially sectional view taken along line 7—7 of FIGURE 6;

FIGURE 8 is an end elevation of another embodiment of a pickup assembly in accordance with the present invention;

FIGURE 9 is a partially sectional view taken along line 9—9 of FIGURE 8;

Figure 10:
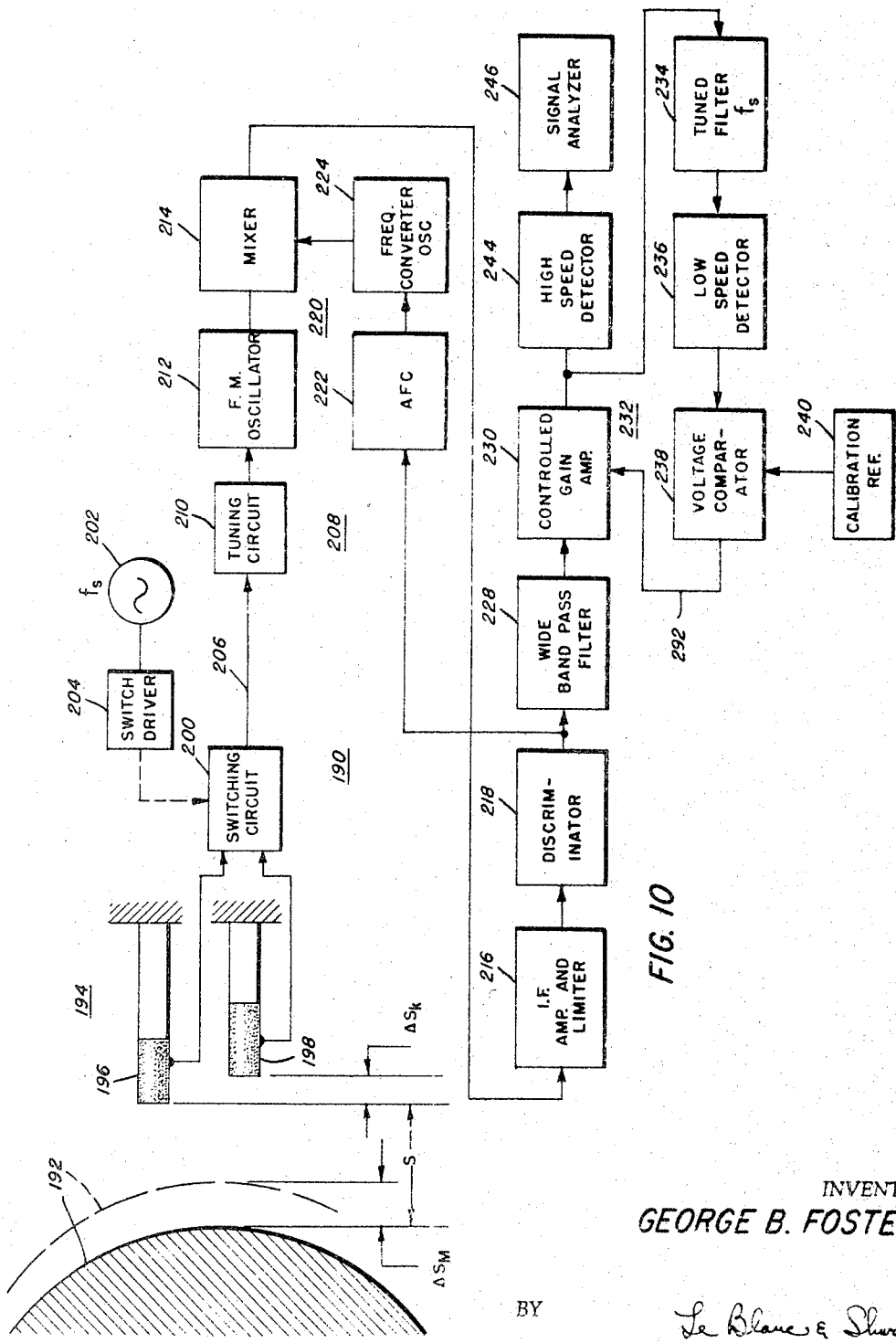
FIGURE 10 is an electronic block diagram showing a practical embodiment of a sequentially switched directional vibration transducer in accordance with the present invention.
Figure 11:
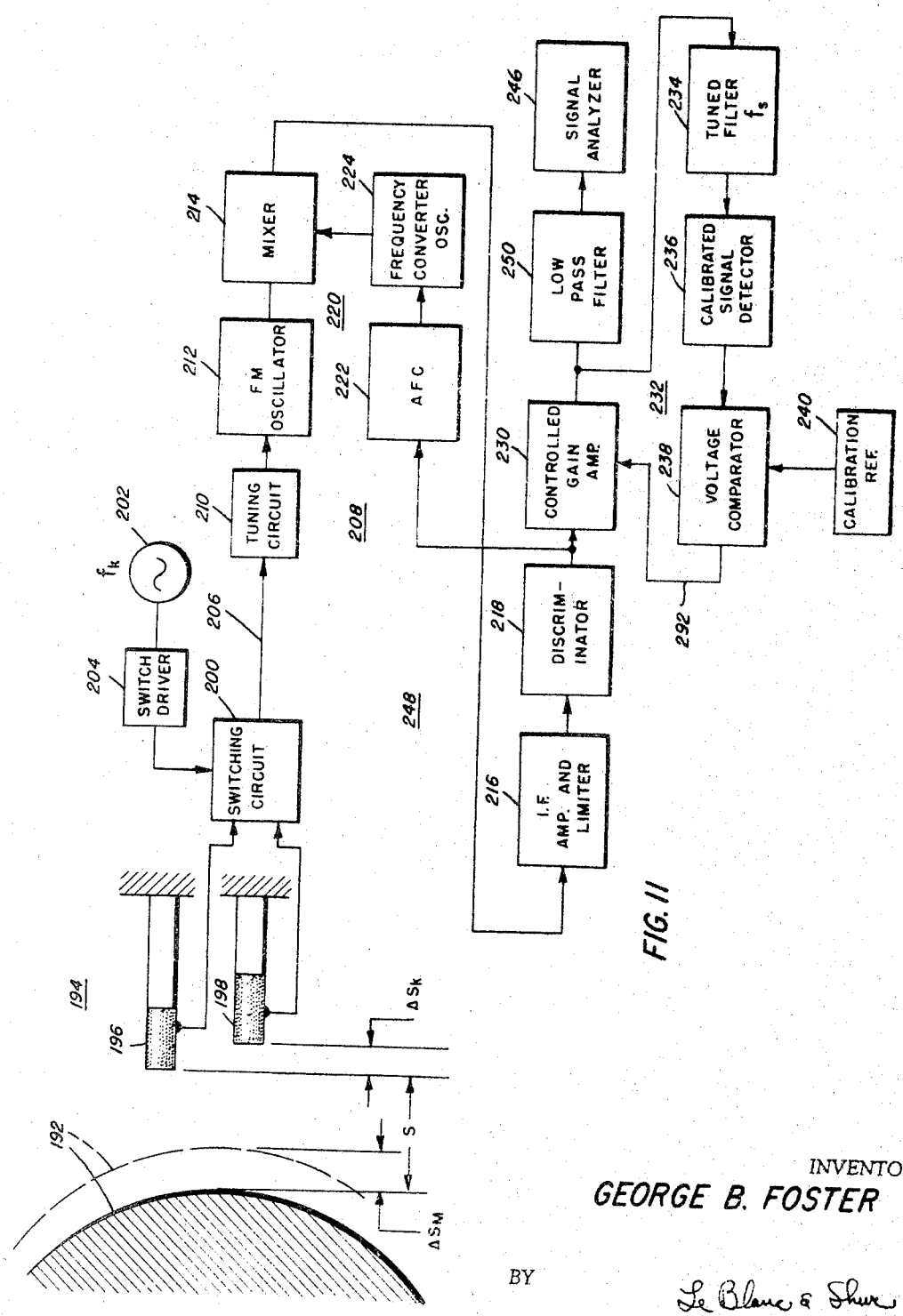
Figure 12:
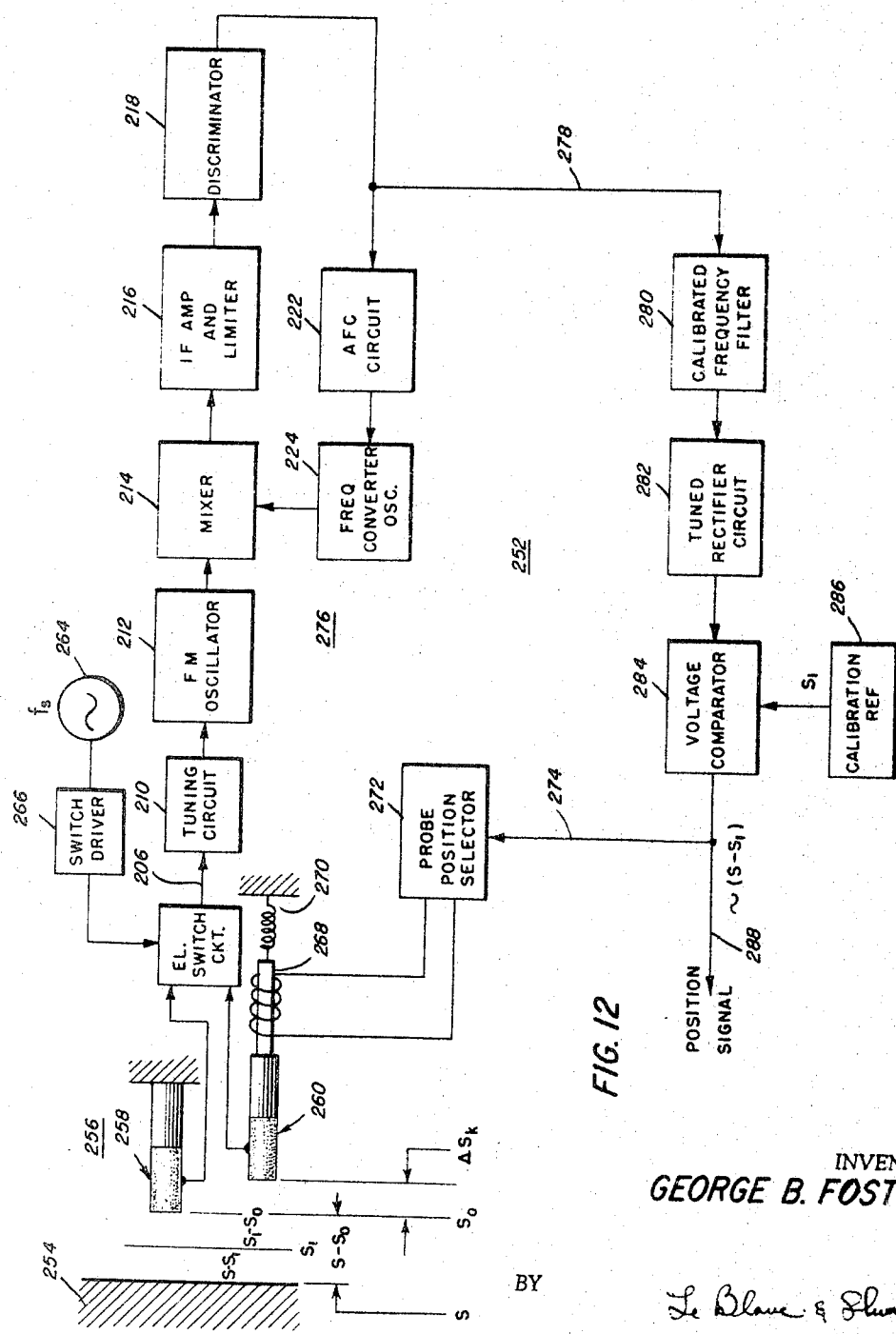

FIGURE 11 is an electronic block diagram showing the manner in which the system of FIGURE 10 may be modified to obtain omnidirectional response if desired; and FIGURE 12 shows an electronic block diagram of a system in accordance with the present invention for position measurement or dimensional comparison characterized by a linear relationship between the system output and the variable to be measured.

Referring first to FIGURE 1, there is shown a transducer system, generally denoted at 20, in accordance with the teachings of the above-mentioned Foster United States Patent No. 3,180,136. The system comprises an energy sensitive pickup 22 positioned in close proximity to, but not in contact with, an object 24 under inspection. Several types of energy sensitive pickups may be employed as explained in the aforementioned U.S. Patent No. 3,180,136. For example, if object 24 is formed of electrically conductive material, then pickup 22 may be comprised of electrically conductive material, insulated from object 24. Such a pickup is directly responsive to electric field variations and is characterized by a capacitive impedance which varies as a function of the pickup to object spacing. As will be appreciated, other suitable pickups may also be employed.

In any event, pickup 22 may be considered to include a sensitive portion 26 of a non-sensitive support portion 28 for maintaining the pickup in operative relationship to the object under inspection.

Pickup 22 is adapted to be axially vibrated for calibration purposes by drive means 29 shown schematically as an electrical oscillator 30 of fixed frequency $f_k$, of a suitable driver 32, and a solenoid 34 surrounding pickup support portion 28. Drive means 29 is operative to vibrate the pickup 22 against a restraint schematically indicated at 36. The foregoing elements are so designed that sensitive portion 26 of pickup 22 is subjected to a continuous cyclic displacement relative to object 24 with a peak-to-peak displacement $\Delta S$ from a nominal standoff distance S, as shown. The known characteristics of this vibration, i.e., its frequency $f_k$, and its amplitude $\Delta S$, are employed as described below to achieve continuous control of system sensitivity independent of standoff distance S or varying environmental conditions.

The output of pickup 22 is provided over a signal path 38 to an electronic processing circuit, generally designated at 40. Processing circuit 40 includes a translator circuit 42, a controlled gain amplifier 44, a low pass filter 46, and a suitable utilization circuit 48, connected in series as shown.

Translator circuit 42 is generally representative of an appropriate electronic sub-system for converting the pickup output appearing on lead 38 into a suitable form for further processing, and may simply be an amplifier, an impedance converter, etc., or in the case of the electric field sensitive pickup described above, is preferably a frequency modulation data channel such as described in detail hereinafter.

In any event, the output of translator circuit 42 is connected through controlled gain amplifier 44. The latter is characterized by any desired circuit configuration but preferably includes externally accessible means for automatically adjusting the amplification thereof. Amplifier 44 is of sufficient bandwidth to pass the entire range of expected frequencies in the output of translator circuit 42.

The external gain control for amplifier 44 is provided by means of an automatic gain control feedback loop 50 comprising a narrow bandpass filter 52, a detector circuit 54, a signal comparator 56, and a calibration reference signal generator 58. Calibration signal filter 52 is preferably a tuned filter or is of any other suitable design, and is adjusted to the frequency $f_k$ produced by signal generator 30. Filter 52 is preferably quite selective whereby to pass only the desired frequency $f_k$ and to reject the remaining portions of the spectrum passing through controlled gain amplifier 44.

The filter output is connected to a detector circuit 54 which converts the filter output into a DC level representative of the peak-to-peak amplitude of the pickup output at the frequency $f_k$. The detector output is coupled to signal comparator circuit 56 which compares the detector output with a signal level established by calibration frequency signal generator 58, and provides an output on lead 60 to adjust the gain of amplifier 44.

As previously indicated, several types of pickups are adapted for use in accordance with the present invention. However, such pickups are generally characterized by an electrical response which is inversely related to some function of the pickup-to-object spacing. Thus, for a pickup positioned as shown in FIGURE 1 at a distance S and subject to an incremental displacement $\Delta S$, at a frequency $f_k$, there will be a pickup output component at frequency $f_k$ indicative of the incremental system response to the displacement $\Delta S$. On the other hand, because of the inverse distance relationship, the incremental sensitivity will vary in accordance with the standoff distance.

For a capacitive pickup described above, the apparent cyclic variation $\Delta S$ will produce a cyclic variation of the pickup capacitance $\Delta C$, the magnitude of which depends inversely on the standoff distance S. In other words, the effective system sensitivity G is a non-linear relationship such that for small $\Delta S$:

$$G = \frac{\Delta C}{\Delta S} = f(\Delta S, S) \qquad (1)$$

Thus, it will be appreciated that the system response to an unknown vibration, e.g., of object 24, depends on the separation distance S as well as upon the unknown vibration amplitude. Moreover, environmental factors such as temperature or contamination as well as internal circuit parameters also affect the value of G, whereby Equation 1 above should actually be modified to read:

$G = f(\Delta S, S,$ various environmental and other factors$)$ (1')

Unless the incremental sensitivity G can be maintained constant, independent of standoff distance or other factors, meaningful measurement of the unknown vibration may not be possible. In the system of FIGURE 1, automatic gain control feedback loop 50 automatically serves to adjust the sensitivity of amplifier 44, and therefore the overall system sensitivity.

This is accomplished as follows:

Since the pickup output includes a component at frequency $f_k$ corresponding to a known peak-to-peak vibration, i.e., $\Delta S$, and since the incremental sensitivity varies in accordance with Equations 1 and 1' above, it is possible to compare the actual system response at frequency $f_k$ to that which would result for an effective incremental system sensitivity fixed at any desired value. The calibrating vibration at frequency $f_k$ is extracted from the output of amplifier 44 by means of filter 52 and provided to detector 54 to convert the same into a DC level representative of the peak-to-peak-calibrating vibration, i.e., a signal representative of the actual system sensitivity to the known calibrating vibration.

This signal is compared with the reference signal level provided by calibration reference signal source 58. This level is adjusted to equal the desired output of detector 54 in response to the displacement $\Delta S$ for incremental sensitivity G at the desired value. If changes in standoff distance S or other environmental effects cause variation of the system sensitivity, a non-zero output is provided on lead 60. Hence, the output of comparator 56 serves to adjust the gain of amplifier 44 to return the system sensitivity to the desired value. In this way, the incremental sensitivity remains constant for signals at the frequency $f_k$. Since the overall system frequency response is substantially constant over all frequencies of interest, the entire system sensitivity to all signals passing through control gain amplifier 44 is continuously maintained at the desired level.

The frequency $f_k$ may be chosen arbitrarily, though in practice it must be sufficiently low that pickup 22 is capable of movement at that frequency. On the other hand, $f_k$ is preferably above the maximum frequency at which vibration is expected to occur to insure maximum system bandwidth. Alternatively, the frequency $f_k$ could be below the minimum frequency to be measured.

Assuming now that object 24 is vibrating at some frequency $f_v < f_k$, signals corresponding to such vibration are included in the pickup output on lead 38 and pass from translator circuit 42 through control gain amplifier 44 to low pass filter 46. Low pass filter 46 is adapted to provide a cutoff somewhat below the frequency $f_k$ whereby only signals below such frequency are passed. The output of filter 46 is coupled to utilization circuit 48, the latter being generally representative of conventional harmonic analyzers or the like commonly employed in vibration studies.

The above described system has considerable utility in areas where accurate and convenient vibration measurement has previously been impossible. However, a limitation on the use of transducer system 20 exists when attempts are made to measure vibration under conditions generally indicated by the construction of object 24 in FIGURE 1.

Specifically, let it be assumed that vibrating object 24 includes a horizontal surface 62 and a vetrical surface 64 and is subject to a horizontal vibration $V_h$ and a vertical vibration $V_v$ in the directions shown. Also, let it be assumed that the component of vibration of interest, i.e., that to be measured by means of transducer system 20, is that designated $V_h$. As may be seen, the vibration $V_h$ results in a variation in the spacing S between pickup 22 and surface 64 while the vibration $V_v$ results in variation in the distance X between pickup 22 and vibrating surface 62. For the conductive pickup described, both the spacing S and the spacing X will contribute to the effective capacitance, and the pickup output on lead 38 will reflect vibration $V_v$ as well as vibration $V_h$. In other words, pickup 22 exhibits a substantially omnidirectional response which, under the conditions shown, renders it substantially impossible to separate and identify the vibration component $V_h$ for purposes of measurement.

According to the present invention, it has been found that in addition to information relating to the vibrations $V_h$, $V_v$, and to the calibrating vibration at frequency $f_k$, considerably more information is contained in the pickup output signal. This information, if properly utilized, may provide the directional pickup response desired under certain circumstances.

In particular, it is found that in addtiion to the fundamental component at frequency $f_k$, there are also present upper and lower sidebands about frequency $f_k$. Where the frequency $f_k$ is sufficiently high in relation to the frequencies of vibration to be measured, these sidebands have been found to comprise an amplitude modulation of the frequency $f_k$ at the entire spectrum of vibration frequencies corresponding to that portion of the vibration frequencies occurring in a direction parallel to the direction associated with the frequency $f_k$. In other words, for the configuration shown in FIGURE 1, the pickup output includes an amplitude modulation of the calibrating signal by the vibration $V_h$, which modulation is totally unaffected by vibration $V_v$, and which should be recoverable by straightforward demodulation. In principle, it should be possible to accomplish such demodulation directly by modification of the circuit of FIGURE 1 in accordance with FIGURE 2.

Here, the output of amplifier 44 is connected through a filter 66 arranged to pass the calibration frequency $f_k$ and the upper and lower amplitude modulation sidebands and to provide the same as an input to a high speed detector circuit 68. Detector circuit 68 is designed in conventional fashion including filtering and rectifying circuitry of any desired type. However, the time constant of the circuit must be so chosen that the modulation envelope $V_h$ is reproduced without distortion. In practice, a time constant $t = \frac{1}{10} f_{v(max)}$, ($f_{v(max)} =$ the maximum expected vibration frequency) is quite satisfactory. This would provide an output of detector 68 accurately representative of the vibration $V_h$, independent of the unwanted vibration $V_v$.

Unfortunately, in attempting to proceed in the manner outlined above, difficulties are encountered due to the mechanical origin of calibrating vibration at frequency $f_k$. In particular, it has been found that successful demodulation of the directional component of the pickup output requires a calibrating frequency $f_k$ related to the frequency $f_{v(max)}$ such that:

$$f_k = A f_{v(max)} \qquad (2)$$

where A is at least about 4, but preferably is at least about 10. Thus, in order to provide successfully the required directional sensitivity with the system of FIGURES 1 and 2, it is necessary that pickup 22 be capable of vibration at a frequency at least 10 or more times greater than the maximum expected frequency of vibration being measured. In other words, successful directional measurement of vibration at a frequency of 1000 Hz. requires a vibrating capability for pickup 22 of at least about 10,000 Hz. Similarly, measurement of vibration at higher frequencies imposes even greater demands upon the mechanical properties of the pickup. In practice, a frequency $f_k$ substantially in excess of 250–500 Hz. cannot conveniently be obtained.

As disclosed in detail in the aforementioned concurrently filed application Ser. No. 672,602, where the object under inspection includes a rotating portion, e.g., a shaft, an interrupted surface calibration member may be installed or formed thereon to obviate the need for vibration of pickup 22. There, the passage of the interrupted surface in front of the pickup establishes an apparent calibrating vibration which may be employed in the manner described above to achieve continuous system calibration. On the other hand, practical limitations on the dimensions of the pickup and of the calibrating member itself impose certain frequency limitations on system utility. Moreover, the availability of a suitable rotating element upon which to affix or form the calibration member is also a limitation on the utility of such a system.

In contrast, the system shown schematically in FIGURE 3 constitutes an exceedingly advantageous complement to the systems disclosed in the Foster Patent No. 3,180,136 and in concurrently filed application No. 672,602. Such a system, generally denoted at 70, comprises a transducer assembly 72 including a pair of adjacent rigid pickups 74 and 76, and a two position switch 78 operated by means of a signal source 80 and a switch driver 82. The output of switch 78 is connected to a signal processing system including a translator circuit 84, a wide bandpass filter 86, a controlled gain amplifier 88 and a high speed detector circuit 90.

Pickups 74 and 76 each include a sensitive portion 92 and a supporting portion 94, and are preferably of the capacitive type described above. Alternatively, any other suitable pickups may be employed. Pickups 74 and 76 are displaced with respect to each other by a distance $\Delta S_k$ and are maintained in such fixed relationship in any convenient manner. In use, transducer assembly 72 is positioned in close proximity to, but not in contact with, the vibrating object 96. The latter may be of any type, e.g., similar to object 24 in FIGURE 1, and is characterized by a vibration $V_v$ in the vertical direction, and a vibration $V_h$ in a horizontal direction. Again, only the vibration $V_h$ is to be measured.

As shown in FIGURE 3, sensitive portion 92 of pickup 74 is positioned at a distance S from the vertical surface 98 of object 96. The sensitive portion 92 of pickup 76 (the latter displaced from pickup 74 by a distance $\Delta S_k$), is displaced from surface 98 by a distance $S + \Delta S_k$. Pickups 74 and 76 are laterally displaced by a distance $d$ which is small in comparison to the spacing S and the dimensions of object 98 whereby the field energy and variations thereof affect both pickups in a substantially identical manner, except for sensitivity variations which are functionally related to the standoff distance.

As to the latter, however, it will be recalled that the sensitivity of the pickups to an incremental displacement is a non-linear distance dependent function. Thus, switching between pickups 74 and 76 at a rate $f_S$ may be considered equivalent to the use of a single pickup having a sensitivity G which switches from a value G(S) to a value $G(S+\Delta S_k)$ at a rate of $f_S$ cycles per second. Since this is precisely the effect achieved in the use of a vibratory pickup such as shown in FIGURE 1, it will be appreciated that from the standpoint of continuous calibration, the switched pickups of FIGURE 3 are entirely equivalent to the vibratory pickup of FIGURE 1.

Moreover, the switched pickup arrangement possesses a number of distinct advantages over the vibratory pickup. For example, with reference to FIGURE 3, the switch shown schematically at 78 is preferably a solid state or like switching circuit under the control of switch driver 82. Thus, Equation 2 above is found to impose no practical limitations on system operation since the requirements of Equation 2 can easily be met by currently available solid state switching circuitry for any vibration frequencies likely to be encountered. With a solid state switching system and the pickup assembly shown in FIGURE 3, directional measurement of mechanical displacement is limited only by the electrical frequency response of the measurement circuits and not by mechanical constraints on the pickup.

Another advantage of the present arrangement is that it eliminates the complexities and requirements arising from the presence of a calibrating signal in the same general frequency band as the measured signals. The high pass filters, low pass filters or band rejection filters needed in the earlier system are not required in the favored embodiments of the instant invention.

As another example, for a vibratory pickup, it will be understood that for measurements of vibrations of objects at a large distance from the pickup or with large peak-to-peak displacements, the required peak-to-peak displacement $\Delta S$ may impose practical limitations on pickup design, e.g., on the frequency and/or amplitude of pickup vibration. Again, in accordance with Equation 2, there results a corresponding limitation on the maximum frequency at which the pickup is capable of directional response. On the other hand, measurement of large amplitude vibration suggests an accompanying large peak-to-peak excursion of the pickup since satisfactory system response over an extremely wide range of vibration amplitudes, i.e., a wide dynamic range, may require exceedingly complex circuit design, and in some cases may even impose demands unrealizeable in practice. For directional measurement, the amplitude of the measured vibration must not exceed the amplitude of the modulated "carrier" in order to prevent distortion or loss of information during demodulation. Since pickups 74 and 76 may be axially displaced by any desired distance $\Delta S_k$, it is readily possible to design the pickup assembly 72 to accommodate wide range of vibration amplitudes.

The output of switch 78, or in practice, of the substituted solid state switching circuit, is connected through translator circuit 84, again designed to accommodate the particular type of pickups employed, and is then provided to a wide bandpass filter 86. Filter 86 is centered at the frequency $f_S$ and is adapted to pass the upper and lower sidebands corresponding to the vibration $V_h$. The output of filter 86 is connected to a controlled gain amplifier 88 generally similar to that designated at 44 in FIGURE 1. A gain control feedback loop 104, including a calibration frequency filter 106, a detector 108, a signal comparator 110, and a calibration reference signal generator 112, is connected to an automatic gain control input for amplifier 88. This permits adjustment of the overall system sensitivity in accordance with the system response to the apparent incremental displacement at frequency $f_S$. The operation is identical to that described above in the case of gain control loop 50 shown in FIGURE 1.

The output of controlled gain amplifier 88 is connected to a high speed detector 90 similar to detector 68 of FIGURE 2. The time constants associated with detector 90 are selected to insure complete and undistorted recovery of the information contained in the upper and lower sidebands of the modulation signal. Thus, the vibration signal at the output of detector 90 is highly directional, i.e., is representative of the vibration $V_h$ parallel to the apparent incremental vibration, and is substantially unaffected by the undesired vibration $V_v$.

In FIGURES 4-9 are shown several embodiments of practical realizations for the transducer assembly shown schematically at 72 in FIGURE 3.

With reference first to FIGURES 4 and 5, there is shown a transducer 114 having a fixed displacement $\Delta S_k$ between the individual pickup elements 115 and 116. Transducer 114 is responsive to electric field energy variations, i.e., it exhibits a variable capacity output as a function of the pickup to object spacing. Transducer assembly 114 includes an electrically conductive casing 117, grounded at 118 to provide shielding and to prevent interaction between the two pickup elements 115 and 116.

Pickup 115 is comprised of an elongated cylindrical rod 120 formed of electrically conductive material closely surrounded by an insulating sleeve 122. The latter is preferably formed of material having a low dielectric constant, e.g., ceramic, to minimize shunt capacity to ground. Rod 120 and surrounding sleeve 122 are tightly fitted into a cylindrical bore 124 in casing 117. A wire 126 soldered, or otherwise secured to the end of rod 120, serves as the electrical output for pickup element 115.

Pickup 116 is similar in construction to pickup 115. It includes conducting rod 128, and an insulating sleeve 130 positioned in a further cylindrical bore 132 in casing 117. A wire 134 attached to rod 128 serves as the electrical output for pickup 116.

Pickups 115 and 116 are disposed in parallel relationship separated by a transverse distance $d$ which is preferably quite small releative to the dimensions of the object under inspection. Also, as previously mentioned, pickups 115 and 116 are displaced by a distance $\Delta S_k$, to provide the desired incremental sensitivity variation. Leads 126 and 134 are connected to the input to the pickup switching circuit 78 or its solid state equivalent to provide the required apparent incremental displacement $\Delta S_k$.

In FIGURES 6 and 7 is shown, at 136, a modified version of the transducer 114 of FIGURES 4 and 5. Transducer 136 also provides an electrical output in the form of a capacity variation but differs from transducer 114 in permitting adjustability of the misalignment distance $\Delta S_k$, and in the placement of the pickup elements in coaxial, rather than laterally spaced relationship.

A first pickup element 138 comprises a cylindrical rod 140, friction fitted in a surrounding low dielectric constant insulating sleeve 142, which in turn, is frictionally engaged in a surrounding metal tube 144, grounded at 146 to provide shielding for rod 140.

A second pickup element 148 comprises a tubular conducting member 150, and a pair of low dielectric insulating sleeves 152 and 154. Sleeve 152 is frictionally received within conducting tube 150 while sleeve 154 surrounds tube 150 to assure electrical insulation thereof from the remaining internal and external components of the transducer.

A metallic tubular casing 155 is provided to receive insulating sleeve 154 with frictional fit. Casing 155 is grounded at 146 to provide shielding as well as protection for the transducer internal components.

Pickup element 138 is threadedly received in pickup element 148 to permit adjustment of the spacing thereof along the longitudinal axis of transducer assembly 136. Thus, metal tube 144, externally threaded at 156 to engage with complementary internal threads 158 on a further metal tube 159, is press fitted into insulating sleeve 152 of pickup element 148. A suitable lock nut 160 and cooperating spacer 161 are provided to assure retention of the desired spacing $\Delta S_k$ between pickup elements 138 and 148. Conducting leads 162 and 163 are secured in any convenient fashion to conducting rod 140 and tube 150 respectively, for coupling pickup elements 138 and 148 to the associated switching system.

Referring now to FIGURES 8 and 9, there is shown yet a further embodiment for a switched pickup transducer assembly, designated as 164. Transducer assembly 164 is similar in construction to transducer pickup 114 in the employment of laterally spaced and axially fixed pickup elements. However, transducer 164 is of the eddy current type, and provides an output which is a function of distance sensitive variations of magnetic, rather than electric fields.

Transducer 164 is comprised of a pair of pickup elements 165 and 166, and an outer metallic casing 167, grounded at 168 to provide shielding and to prevent pickup interaction. Pickup element 165 includes a sensing coil 170, wound on a suitable tubular core 172. Sensing coil 170, surrounded by a suitable insulating sleeve 174, is received in a cylindrical bore 176 in casing 167.

Similarly, pickup element 166 is comprised of a sensing coil 178, having the same number of windings as coil 170, wound on a tubular core 180, within an insulating sleeve 182. The latter is received in an axial bore 184 in casing 167.

Ends 185 and 186 of sensing coils 170 and 178 respectively, are connected to ground at 168 while the other ends 187 and 188 serve as signal output leads for connection to the probe switching circuitry as described above.

Sensing coils 170 and 178 are longitudinally displaced by a distance $\Delta S_k$ to provide the required difference in incremental sensitivity between the two pickups. As in the previous embodiments, the lateral displacement $d$ is sufficiently small, relative to the object under inspection, that sensitivity or other variations due to such displacement may be ignored.

With respect to the laterally spaced pickups shown in FIGURES 4, 5, 8 and 9, it should be recognized that the rigid axial disposition shown may be modified to provide axial adjustability as in the case of transducer 136 shown in FIGURES 6 and 7, and similarly, that the latter may be designed so that pickup elements 138 and 148 are disposed in fixed axial relationship to each other. In addition, it should be appreciated that the three embodiments shown are by no means exhaustive either as to the arrangement of the pickup elements or in the variable energy effects to which the pickups are adapted to respond. A suitable transducer configuration, as well as the particular energy effects to be exploited, will frequently be suggested by the measurement application involved.

A practical embodiment of the system shown in FIGURE 3 employing a transducer assembly 72, e.g., one of those shown in FIGURES 4–9, is shown in FIGURE 10. The system, generally denoted at 190, is adapted to measure a vibration $\Delta S_m$ of an object 192 under inspection. The system comprises a transducer assembly 194, shown schematically as comprising a pair of laterally and longitudinally spaced capacitive pickup elements 196 and 198, connected to a solid state switching circuit 200. Switching circuit 200 is operated by a fixed frequency signal source 202 at a frequency $f_S$ and a switch driver circuit 204 of any convenient type.

The output of switching circuit 200 is coupled over lead 206 as the signal input to a translator circuit 208, which serves to convert the capacity variation resulting from the combined effects of unknown displacement $\Delta S_m$ and apparent calibrating displacement $\Delta S_k$ into an electrical displacement analog signal for further processing by the system.

Translator circuit 208 comprises a tuning circuit 210, a frequency modulated oscillator 212, a mixer 214, an IF amplifier and limiter 216, and a discriminator 218. Translator 208 also includes a frequency control feedback loop 220, having an AFC circuit 222 and a variable frequency oscillator 224. Switched pickups 196 and 198, tuning circuit 210, and FM oscillator 212 cooperate to form a series tuned variable RF oscillator. The variable capacity appearing on lead 206 modulates the output of FM oscillator 224 to convert the vibration $\Delta S_m$ and the apparent displacement $\Delta S_k$ into a frequency deviation about an RF carrier. The frequency deviation depends on the instantaneous separation between the operative pickup and object 192, while the rate of deviation depends on the various frequencies which comprise the displacement $\Delta S_m$.

The output of FM oscillator 212 is coupled to mixer 214 which effects a frequency conversion of the modulated signal to any desired intermediate frequency under the control of frequency conversion oscillator 224. The mixer output is provided through an IF amplifier and limiter 216, a discriminator 218 to convert the varying frequency output of oscillator 212 into a variable amplitude analog signal for further processing. The design of IF amplifier and limiter 216 and of discriminator 218 is conventional though in the case of discriminator 218, circuitry providing highly linear response is preferred.

The discriminator output is coupled over a lead 226 to a frequency control feedback loop 220 including an AFC signal generator 222 which operates in conventional fashion to adjust the output frequency of variable frequency oscillator 224. In this way, the intermediate frequency output of mixer 214 is maintained near the center of the most linear region of sensitivity of discriminator 218, irrespective of the actual frequency of oscillator 212. The above described circuit configuration is particularly adapted for use with variable capacitance pickups since it operates to convert an impedance variation on lead 206 to a voltage amplitude analog at the output of discriminator 218. For other types of pickups, it should be understood that other configurations for translator circuit 208 may be preferred.

For example, employment of the eddy-current transducer 164 shown in FIGURES 8 and 9, would not require the frequency modulation-demodulation translator since the amplitude of the pickup detected carrier output current is a satisfactory displacement signal analog. Thus, translator 208 may simply provide amplification or attenuation as necessary for obtaining the desired output signal level.

In addition to delivery over lead 226 to AFC loop 220, the output of discriminator 218 is connected through a wide bandpass filter 228 which limits the frequency spectrum of the displacement analog signal to include only the switching frequency $f_S$ and the associated vibration sidebands. However, it should be understood that high or low pass filtering, or even no filtering, may be satisfactory, depending on the frequency characteristics of the remainder of the circuit, etc.

The output of filter 228 is coupled to controlled gain amplifier 230, which is designed with a substantially uniform frequency response for frequency $f_S$ and its sidebands. Amplifier 230 operates to adjust the overall system sensitivity under control of an automatic gain control loop 232. The latter includes a calibration frequency filter 234 responsive to switching frequency $f_S$, a low speed detector 236, and a comparator circuit 238 connected to the output of detector 236, and to a calibration reference signal source 240. Detector 236 is a simple rectifier-filter combination, or the equivalent for converting the AC signal amplitude at frequency $f_S$ to a corresponding DC level. Either peak or average detection may be employed as desired. Thus, the output of detector 236 is representative of the overall system incremental response to a known apparent displacement, $\Delta S_k$, as explained above.

Voltage comparator 238 is preferably a differential amplifier adapted to compare the DC output of detector 236 with the DC level provided by calibration reference source 240, which is adjusted to equal the detector output which would result for the desired overall system sensitivity. The signal difference is provided as described in connection with FIGURE 1, over a lead 242 to adjust the gain of amplifier 230 thereby setting the overall system sensitivity to signal variation at the calibration frequency $f_S$. Due to the uniform frequency response of amplifier 230, calibration at all frequencies of interest is simultaneously assured.

As previously discussed, directional operation depends on the ability to select a switch frequency sufficiently high in comparison to the frequencies at which vibration is expected to occur that Equation 2 is satisfied.

Under these conditions, a high speed detector 244, of the type shown at 68 in FIGURE 2, will effectively extract the vibration information from the modulation sidebands present around switching frequency $f_S$. A time constant for detector 244 of less than about 10% of the period of the $\Delta S_m$ component of maximum frequency yields excellent results in practice.

The directional vibration output of detector 244 may then be coupled to any suitable utilization equipment 246, for example, a recorder or spectrum analyzer for further processing in any desired manner, as will be appreciated from the foregoing description.

Under certain conditions, the highly directional sensitivity afforded by transducer system 190 shown in FIGURE 10, may not be necessary. For such applications, modification of the system as shown in FIGURE 11 will yield omnidirectional capabilities.

As shown, modified system 248 is essentially similar to system 190 and includes an identical transducer assembly 194, switching circuit 200 and associated driver circuitry, FM translator 208, control gain amplifier 230 and associated gain control feedback loop 232. The system differs, however, in the absence of band limiting filter 228, and in the substitution of low pass filter means 250 for the high speed detector 244 shown in FIGURE 10.

As explained above, and in the aforementioned Foster U.S. Patent No. 3,180,136, the output of the various non-contacting energy sensitive transducers to be employed in the present invention includes components at all frequencies associated with pickup-to-object displacement. However, no displacements other than those parallel to the calibrating displacement (either real or apparent as taught herein), are present in the modulation sidebands of the calibrating frequency signal. Thus, omnidirectional response requires processing of the entire spectrum of the amplitude analog signal appearing at the output of discriminator 218 without the interposition of band limiting as in FIGURE 10. On the other hand, continuous calibration requires the passage through amplifier 230 of the calibration frequency signal, as well as the vibration signal components at lower frequencies. Thus, the output of amplifier 230 includes at least the lower sideband of the directional modulation signal.

Accurate reproduction of the entire range of vibration signals requires the removal of the calibrating frequency and its associated modulation sidebands before processing the amplitude analog signal. This is accomplished by employment of a low pass filter 250 in which the cutoff frequency is so chosen to fall below the lower modulation sideband but above the frequency of the highest frequency vibration component. In this regard, it will be noted that choice of a sufficiently high frequency $f_S$ in relationship to the expected frequencies of vibration is desirable here, as well as in the case of directional operation since it reduces the need for extremely sharp frequency cutoff in filter 250.

As will be appreciated, the output of filter 250 is representative of the actual displacement of the object 192 under inspection relative to transducer assembly 194. Thus, a signal analyzer 246 directly coupled to the output of filter 250, permits direct utilization of the vibration signal for any desired purpose.

Due to the convenience with which the switched pickup transducer of the present invention may be adapted to provide adjustable calibrating displacement $\Delta S_k$, and because of the extremely wide dynamic range which can be obtained due to such adjustability, it has been found that the switched pickup concept may readily be adapted to the provision of a linear dimension comparator system, generally similar to that shown in assignee's copending U.S. patent application, Ser. No. 515,533, filed Dec. 22, 1965, in the name of George G. Foster, and entitled "Non-Contacting Displacement Gauge." Apparatus of this type is characterized by a linear relationship between electrical output and mechanical displacement of the object under inspection, notwithstanding the highly nonlinear characteristics of the various pickups employed. A linear displacement gauge embodying the switched pickup concepts of the present invention, is shown in FIGURE 12.

The system, generally denoted at 252, is adapted to measure displacement of an object 254 in terms of the separation C–$S_0$ between the object and a transducer assembly 256, comprising a pair of pickup elements shown schematically as 258 and 260. Transducer 256 is generally of the type described above wherein the two pickup elements, longitudinally displaced by a distance $\Delta S_k$, are alternately switched into a measuring circuit by means of solid state switching means 262 under the control of a fixed frequency signal generator 264 and a switch driving circuit 266 in the manner previously described.

Transducer assembly 256 is unique, however, in the employment of an automatically positionable pickup element 260 whereby a signal controlled, rather than a manual adjustment, of the value of $\Delta S_k$, may be achieved. The mechanism for effecting such adjustment is shown schematically as solenoid 268 and restraining mechanism 270, coupled to pickup element 260. Position adjusting solenoid 268 is provided an energizing signal by a probe position adjuster 272 comprising a variable current drive externally controlled by a signal appearing on a lead 274 in a manner to be described below.

In the embodiment shown, transducer assembly 256 is represented schematically, although it should be appreciated that the transducer embodiment shown in detail in FIGURES 6 and 7, can readily be modified to provide automatically variable longitudinal spacing between the pickup elements. Similarly, any other equivalent means for providing adjustable position, either for the variable capacity embodiment of FIGURES 6 and 7, or of any other energy responsive type, may be employed.

For a transducer 256 of the capacitive type, the output of solid state switching circuit 262 is coupled to a translator circuit 276, the latter being substantially identical to translator circuit 208, described above in connection with FIGURES 10 and 11. Translator 276 converts the variable capacity output of transducer 256 into a signal amplitude analog of the spacing S–$S_0$ between fixed pickup 258 and object 254. The output of translator 276 is connected by lead 278 to a calibration frequency filter circuit 280 of any suitable type adapted to respond to signals at the switching frequency $f_S$ and to reject other components present in the displacement analog output signal. As will be appreciated, the nature of filter 280 will depend on the spectrum of the signals appearing on lead 278 and may comprise a broad or narrow bandpass filter, or a low pass filter as appropriate.

The output of filter 280 is coupled to a rectifier circuit 282 which serves to convert the signal at frequency $f_S$ to a DC level representaitve either of the average or peak value as desired. Rectifier circuit 282 is connected to a voltage comparator 284, e.g., a differential amplifier. A second input for comparator 284 is provided by a calibration reference signal generator 286, an adjustable DC source of any suitable construction.

The output of calibration reference source 286 represents the expected system response to the apparent displacement at frequency $f_S$ which would result for object 254 positioned at a reference distance $S_1$. Thus, the output of comparator 284 is representative of the difference between system sensitivity at distance S and at distance $S_1$.

In accordance with the present embodiment, the sensitivity difference is regarded as being correlated with the distance $S-S_1$, to produce an output signal;

$$E_{out}=f(S-S_1) \quad (3)$$

In addition, the signal $E_{out}$ is coupled over lead 274 to probe position adjuster 272. The later is designed to maintain a constant ratio between the actual value of $E_{out}$ and the apparent calibrating displacement $\Delta S_k$. In other words:

$$\Delta S_k = K_1 f(S-S_1) \quad (4)$$

As a result, it is found that the ratio of $\Delta S_k$ to S remains constant and the functional relationship implied by Equation 3 becomes:

$$E_{out}=K_2(S-S_1) \quad (5)$$

where $K_2$ is a sensitivity or amplification factor independent of the non-linear sensitivity of pickup elements 258 and 260. Thus, the signal $E_{out}$ is immediately available in linear form for further processing or convenient visual display.

The system described above shares all of the advantages of the system described in the aforementioned Foster application No. 515,533, and the additional valuable benefits resulting from employment of the non-vibratory transducer assembly described herein. For example, a wide range of pickup element spacing which may readily be achieved. Moreover, as will be appreciated, the incremental sensitivity variation due to the apparent displacement $\Delta S_k$ is associated with an object disposed along the axis of apparent displacement whereby other objects or portions of the object under inspection do not affect the measurement. In short, the system provides an inherently directional, as well as linear, response.

There has been described above, several embodiments of non-contacting displacement measuring systems employing the sequentially switched pickup concept in accordance with this invention, as well as several alternative embodiments of pickup assemblies per se. However, it should be recognized that the concepts of the present invention may be utilized in numerous additional embodiments within the scope of the invention, and that variation in design of the embodiments shown is also contemplated.

For example a non-linear gauging signal $E_{out}=f(S)$ may be obtained by maintaining the differential distance $\Delta S$ constant while the spacing to the object S is varied. For many applications this is a fully practical form of gauging signal. If necessary, a linear output may be obtained by passing the signal through a suitable curve straightener element to achieve the required degree of linearity.

As another example, circuit modifications in the various embodiments shown in FIGURES 10–12 are readily possible. As yet another example, modification of the system of FIGURE 12 generally in accordance with the disclosure of Foster application Ser. No. 515,533, to measure dynamic displacement, it also contemplated. In addition, it should be recognized that multiple axis directional measurement, generally in accordance with the aforementioned concurrently filed Foster application Ser. No. 672,602, may be achieved, if desired.

Thus, the invention may be embodied in other specific forms without departing from the spirit or essential characteristics thereof.

What is claimed is:

1. A non-contact displacement transducer adapted to be positioned during use in proximity to but not in contact with an object to be observed comprising; sensing means in said transducer responsive to incremental variations in spacing between said object and said transducer, the sensitivity of response for said transducer varying with the average value of said spacing; electrical circuit means cooperating with said transducer for producing an electrical signal analog of the transducer-to-object spacing; and calibrating means for said transducer comprising means for cyclically varying the sensitivity of said transducer response to simulate an incremental variation of transducer-to-object spacing without actual movement of said transducer.

2. A displacement measuring system including a non-contact displacement transducer as defined in claim 1 wherein said variation of effective transducer sensitivity of responsive is of a fixed frequency and magnitude; wherein said calibrating means and said electrical circuit means cooperate to produce a calibration component in said electrical signal analog at said fixed frequency, and of amplitude dependent upon the magnitude of the simulated incremental variation, and upon the effective sensitivity of response of said transducer at the particular average spacing; and wherein said circuit means include means to compensate for changes in said sensitivity of response by adjusting operation of said circuit to maintain the amplitude of the calibration component at a predetermined level.

3. A displacement measuring system as defined in claim 2 wherein said component means includes a filter circuit adjusted to pass signals at said fixed frequency; a reference signal source; means coupled to said filter circuit for comparing the magnitude of the filter output with the output of said reference signal source to produce a difference signal representative of departure from the desired incremental sensitivity of response of said transducer system; and gain control means for adjusting electrical signal analog to minimize the amplitude of said different signal.

4. A displacement transducer as described in claim 1 wherein said variation of transducer sensitivity is characterized by a fixed frequency $f_s$ greater than the maximum frequency $f_{v(max)}$ at which displacement of said object relative to said transducer is expected to occur.

5. A displacement transducer as described in claim 4 where the frequency $f_s$ exceeds the frequency $f_{v(max)}$ by at least a factor of between about 3 to 10.

6. A displacement measuring system including a transducer as defined in claim 5 wherein said electrical signal analog includes a portion characterized by amplitude modulation, with a carrier at frequency $f_s$, and with sidebands coresponding to frequencies $f_v$ at which displacement of said object relative to said transducer is occurring, the amplitude of each sideband component being representative of the magnitude of displacement at said frequency, and including directional analyzer means comprising amplitude modulation detector means responsive to the amplitude modulated portion of said electrical signal analog.

7. A displacement measuring system including a transducer as set fourth in claim 5 further including directional analyzer means for extracting from said electrical signal analog, components representative of displacement of said object relative to said transducer means along a line defined by the simulated incremental variation of transducer-to-object spacing.

8. A displacement transducer as defined in claim 1 where said sensing means comprises first and second pickups characterized by different sensitivities of response to an incremental variation of object spacing from a given position relative to said transducer; and wherein said calibrating means includes means for sequentially coupling the outputs of said first and second pickups to said circuit means, thereby producing the cyclic variation of the transducer sensitivity of response.

9. A displacement transducer as defined in claim 8 wherein said first and second pickups are characterized by like sensitivities of response, and are disposed in said transducer with the respective measuring portions adapted to be at different distances from said object under inspection.

10. A displacement transducer as defined in claim 1 wherein said sensing means comprises first and second pickup means so positioned relative to each other that said pickup means are at incrementally different spacings from the object to be inspected when said transducer is positioned in proximity to said object, and switching means for sequentially coupling said first and second pickup means to the input of said circuit means.

11. A displacement transducer as defined in claim 10 further including means for adjustably positioning one of said pickup means with respect to the other to vary the difference between the respective spacings of said pickup means and said object under inspection.

12. A displacement transducer as defined in claim 11 wherein said adjusting means comprises signal responsive means coupled to one of said first and second pickup means; and wherein said circuit means includes means coupled to said signal responsive means for adjusting the difference between said first and second positions in response to the magnitude of said electrical signal analog.

13. A displacement transducer as defined in claim 1 further including; casing means; first and second pickups comprising said sensing means, said pickups being disposed in said casing means; said second pickup means projecting outwardly from said casing means a predetermined distance relative to said first pickup means, and switching means for sequentially coupling said first and second pickup means to said circuit means.

14. A displacement transducer as defined in claim 13 further including means for adjusting the distance of projection of said second pickup means relative to said first pickup means.

15. A displacement transducer as defined in claim 1 wherein said sensing means includes first and second pickups; said first pickup being disposed at a first position within said transducer means, said second pickup being disposed at a second pisition within said transducer means; the measuring portions of said first and second pickups being separated by a predetermined distance whereby one of said pickups is adapted to be positioned in closer proximity to said object to be observed; and switching means for sequentially coupling the output of said first and second pickups to the input of said circuit means.

16. A displacement transducer as defined in claim 15 wherein said predetermined distance is small in comparison to the intended pickup to object spacings.

17. A displacement transducer as defined in claim 15 wherein said first and second pickups are of generally cylindrical configuration, with one end of each being adapted to interact with said object under inspection to sense variations in the pickup to object spacing; said pickups being disposed in coaxial relationship with said one end of said first pickup extending beyond said one end of said second pickup.

18. A displacement transducer as defined in claim 15 wherein said first and second pickups are disposed adjacent to each other in said transducer but with one of said pickups projecting from said transducer relative to the other.

19. A displacement transducer as defined in claim 1 wherein said sending means comprises first and second pickups having different effective sensitivities of response to incremental variations of pickup-to-object spacing for a given value of transducer-to-object spacing; and wherein said calibrating means includes switching means for alternately connecting said pickups to said electrical circuit means.

20. A displacement transducer as defined in claim 19 wherein said switching means operates at a frequency in excess of the maximum frequency of expected displacement of said object relative to said transducer.

21. A non-contact position measuring system for determining the location of an object relative to a pre-established reference location comprising: transducer means adapted to be positioned in proximity to said object, said transducer means being responsive to incremental variations in the spacing between said object and said transducer, the sensitivity of said response varying with the average value of said spacing; electrical circuit means for providing an electrical signal analog as a function of said incremental variations; said transducer means including means for producing a cyclic variation of the output of said transducer to simulate a variation of transducer-to-object spacing without movement of said transducer; and means connected to said circuit means for comparing said electrical signal analog with a reference signal characteristic of a reference location, and for providing a difference signal representative of departures of said signal analog from said reference signal, the magnitude of said difference signal being indicative of the displacement of said object from said reference location.

22. A non-contact position measuring system as defined in claim 21 including means coupled to said transducer means and to said comparing means for adjusting the magnitude of the cyclic variation of the transducer output to maintain a linear relationship between said difference signal and the displacement of said object from said reference location.

23. A displacement measuring system as defined in claim 21 wherein said transducer means comprises a casing; first and second pickups disposed in said casing; one of said pickups projecting outwardly from said casing a predetermined distance relative to the other of said pickups; and switching means for sequentially coupling said first and second pickups to said circuit means.

24. A displacement measuring system as defined in claim 23 wherein said transducer further includes means for adjusting the distance of projection of said one pickup relative to said other pickup.

25. A displacement measuring system as defined in claim 21 wherein said transducer means includes first and second pickups, disposed in said transducer at different distances from the intended locations of said object under inspection, and means for alternately coupling said pickups to said circuit means.

26. A non-contact system for measuring displacement of an object comprising a transducer adapted to be positioned in proximity to said object, said transducer being sensitive to variations in energy existing in space, means for establishing an ambient energy level in the space between said transducer and said object, said energy being subject to variation in response to changes in the spacing between said transducer and said object, said transducer including means for producing a cyclic incremental variation of the transducer response to the energy existing in said space independent of the spacing between said transducer and said object; and circuit means cooperating with said transducer for producing an electrical signal as a function of the energy existing in said space, said electrical signal including a calibrating component attributable to said cyclic incremental energy variation; said circuit means including compensating means responsive to the amplitude of said calibrating component for maintaining a constant functional relationship between said spacing and said incremental energy variation.

27. A displacement measuring system as defined in claim 26 wherein said transducer means includes a first pickup characterized by a first energy relationship with respect to an object positioned at a given distance relative to said transducer means; a second pickup characterized by a second energy relationship with respect to an object positioned at said given distance; and switching means for alternately connecting the outputs of said pickup means to the input of said circuit means, said cyclic incremental energy variation being attributable to the different energy relationships characteristic of said first and second pickups.

28. A displacement measuring system as defined in claim 27 where said first and second pickups are responsive to electric field energy variations.

29. A displacement measuring system as defined in claim 27 where said first and second pickups are responsive to magnetic field energy variations.

References Cited

UNITED STATES PATENTS

| | | |
|---|---|---|
| 2,514,578 | 7/1950 | Heller et al. |
| 3,364,422 | 1/1968 | Heuze _____ 324—65 X |
| 3,379,972 | 4/1968 | Foster et al. _____ 324—61 |
| 3,387,776 | 6/1968 | Stillwell et al. _____ 324—61 |
| 3,400,331 | 9/1968 | Harris _____ 324—61 |

EDWARD E. KUBASIEWICZ, Primary Examiner

J. M. HANLEY, Assistant Examiner

U.S. Cl. X.R.

324—71

UNITED STATES PATENT OFFICE
CERTIFICATE OF CORRECTION

Patent No. 3,488,583      Dated January 6, 1970

Inventor(s) GEORGE B. FOSTER

It is certified that error appears in the above-identified patent and that said Letters Patent are hereby corrected as shown below:

Column 4, line 16, "snesitive" should read -- sensitive --
line 38, "o" should read -- to --. Column 7, line 50, "addtiic
should read -- addition --. Column 9, line 67, "Flter" should
read -- Filter --. Column 10, line 10, "coverey" should read
-- covery --. Column 14, line 26 "C-$S_o$" should read -- S-$S_o$ --
line 73, "representaitve" should read -- representative --.
Column 15, line 17, "later" should read -- latter --. Column 1
line 47, "pisition" should read -- position --

SIGNED AND
SEALED
JUL 21 1970

(SEAL)
Attest:

Edward M. Fletcher, Jr.
Attesting Officer

WILLIAM E. SCHUYLER, JR.
Commissioner of Patents